United States Patent
Zhang

(10) Patent No.: US 8,379,380 B2
(45) Date of Patent: Feb. 19, 2013

(54) ELECTRONIC DEVICE WITH ACCESS STRUCTURE FOR HANDLING HARD DISC DRIVE

(75) Inventor: Shuai Zhang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 234 days.

(21) Appl. No.: 12/954,543

(22) Filed: Nov. 24, 2010

(65) Prior Publication Data

US 2012/0050980 A1 Mar. 1, 2012

(30) Foreign Application Priority Data

Aug. 30, 2010 (CN) .......................... 2010 1 0266714

(51) Int. Cl.
*H05K 7/00* (2006.01)

(52) U.S. Cl. ......... 361/679.33; 361/679.37; 361/679.38; 361/679.01; 312/223.1; 312/223.2; 312/333

(58) Field of Classification Search ............. 361/679.33, 361/679.37–679.39, 679.58, 679.01, 679.4, 361/679.43; 312/223.1, 223.2, 333, 334.1, 312/334.2, 294; 174/535, 542

See application file for complete search history.

(56) References Cited

U.S. PATENT DOCUMENTS

| | | | | |
|---|---|---|---|---|
| 4,941,841 A * | 7/1990 | Darden et al. | ........... | 361/679.39 |
| 6,501,644 B1 * | 12/2002 | Silverman et al. | ........ | 361/679.34 |
| 7,265,987 B2 * | 9/2007 | Zhang et al. | .................. | 361/727 |
| 7,440,271 B2 * | 10/2008 | Chen et al. | ................ | 361/679.33 |
| 7,681,210 B2 * | 3/2010 | Jiang et al. | .................... | 720/638 |
| 7,929,289 B2 * | 4/2011 | Tseng | ...................... | 361/679.39 |
| 2011/0103000 A1 * | 5/2011 | Sun | .......................... | 361/679.33 |

* cited by examiner

*Primary Examiner* — Angel R Estrada
*Assistant Examiner* — Dimary Lopez
(74) *Attorney, Agent, or Firm* — Altis Law Group, Inc.

(57) ABSTRACT

An electronic device is provided. The electronic device includes a main body, a HDD, a frame, and two latch members. The main body defines an opening. The main body includes a first casing portion and a second casing portion defining at least one slot. The frame is capable of securing the HDD and capable of being moved into and out of the main body through the opening. Two first positioning posts protrude from the frame. Two latch members are rotatably connected to first casing portion and capable of being rotated into and out from the main body through slots. Each latch member defines a first recessed portion. Each first recessed portion accommodates a part of one first positioning post to latch the frame to the electronic device.

20 Claims, 6 Drawing Sheets

ELECTRONIC DEVICE WITH ACCESS STRUCTURE FOR HANDLING HARD DISC DRIVE

BACKGROUND

1. Technical Field

The present disclosure relates to electronic devices and, particularly, to an electronic device with an access structure for conveniently handling a hard disc drive therein.

2. Description of Related Art

Notebook computers have become a part of everyday life. In the process of updating and maintaining hard disk drives of most notebooks computers, the whole bottom cover of the notebook computer needs to be opened, which is troublesome.

BRIEF DESCRIPTION OF THE DRAWINGS

The components of the drawings are not necessarily drawn to scale, the emphasis instead being placed upon clearly illustrating the principles of an electronic device with an access structure for handling a hard disc drive. Moreover, in the drawings, like reference numerals designate corresponding parts throughout several views.

DETAILED DESCRIPTION

Figure 1:
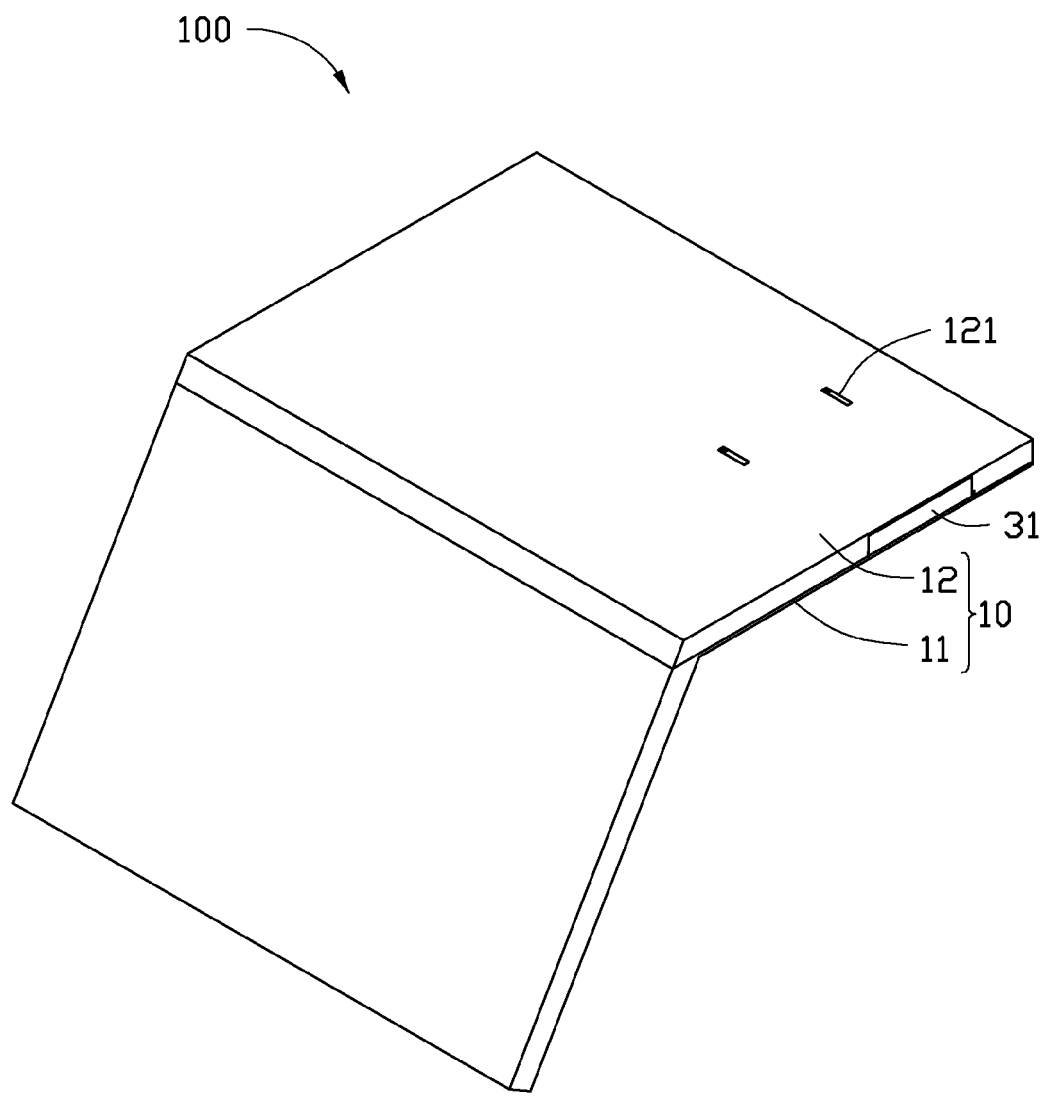
FIG. 1 is an isometric view of an electronic device in accordance with an exemplary embodiment.
Figure 2:
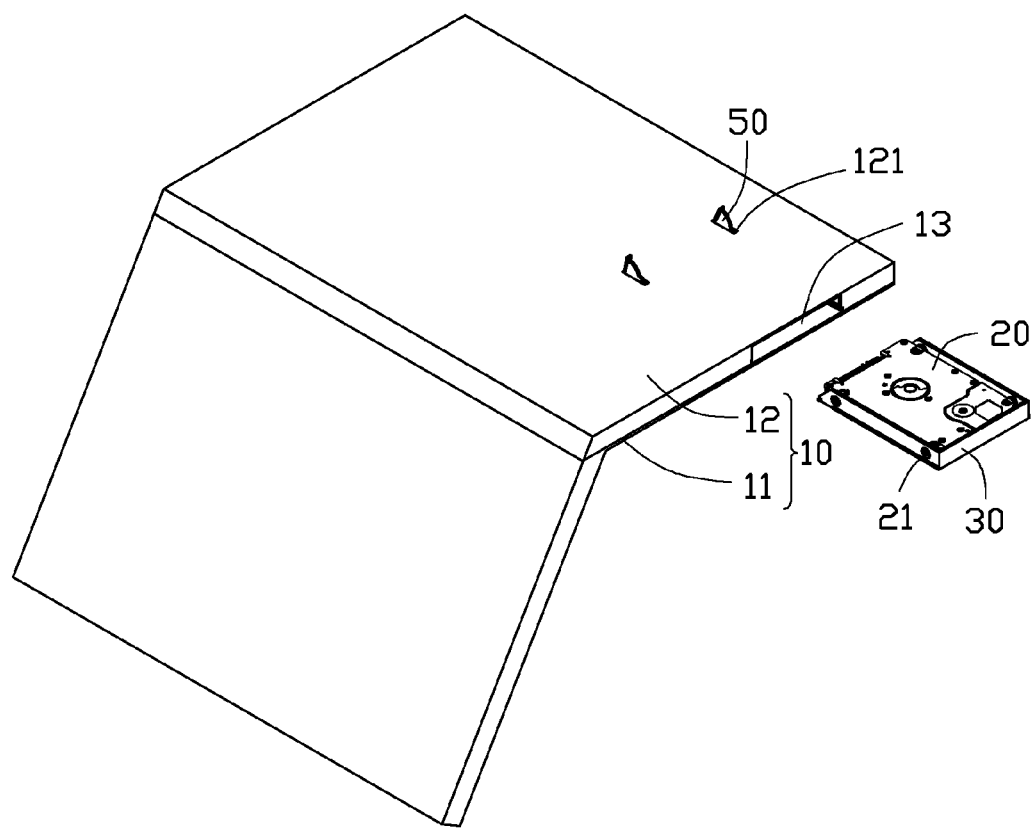
FIG. 2 is a partially exploded, perspective view of the electronic device of FIG. 1, further showing a hard disc drive of the electronic device.

Referring to FIGS. 1-2, an electronic device 100 includes a main body 10. The electronic device 100 may be, for example, a notebook computer, an e-book, or a portable music player. In the embodiment, the electronic device 100 is a notebook computer. The main body 10 includes a first casing portion 11 and a second casing portion 12 cooperatively forming an interior space to accommodate electronic components (not shown). The main body 10 further includes a hard disc drive (HDD) 20. A sidewall 101 of the main body 10 defines an opening 13, through which the HDD 20 can be placed into or removed from the electronic device 100. In this embodiment, the opening 13 is substantially rectangular. Extending through the second casing portion 12 is at least one slot 121. In the embodiment, two slots 121 are deployed. At least one projection 21 protrudes from each of opposite sidewalls of the HDD 20 for securing the HDD 20. In the embodiment, two projections 21 protrude from each of the opposite sidewalls of the HDD 20. In order to protect the HDD 20 from impact, the projections 21 may be made of a rubber type material.

Figure 3:
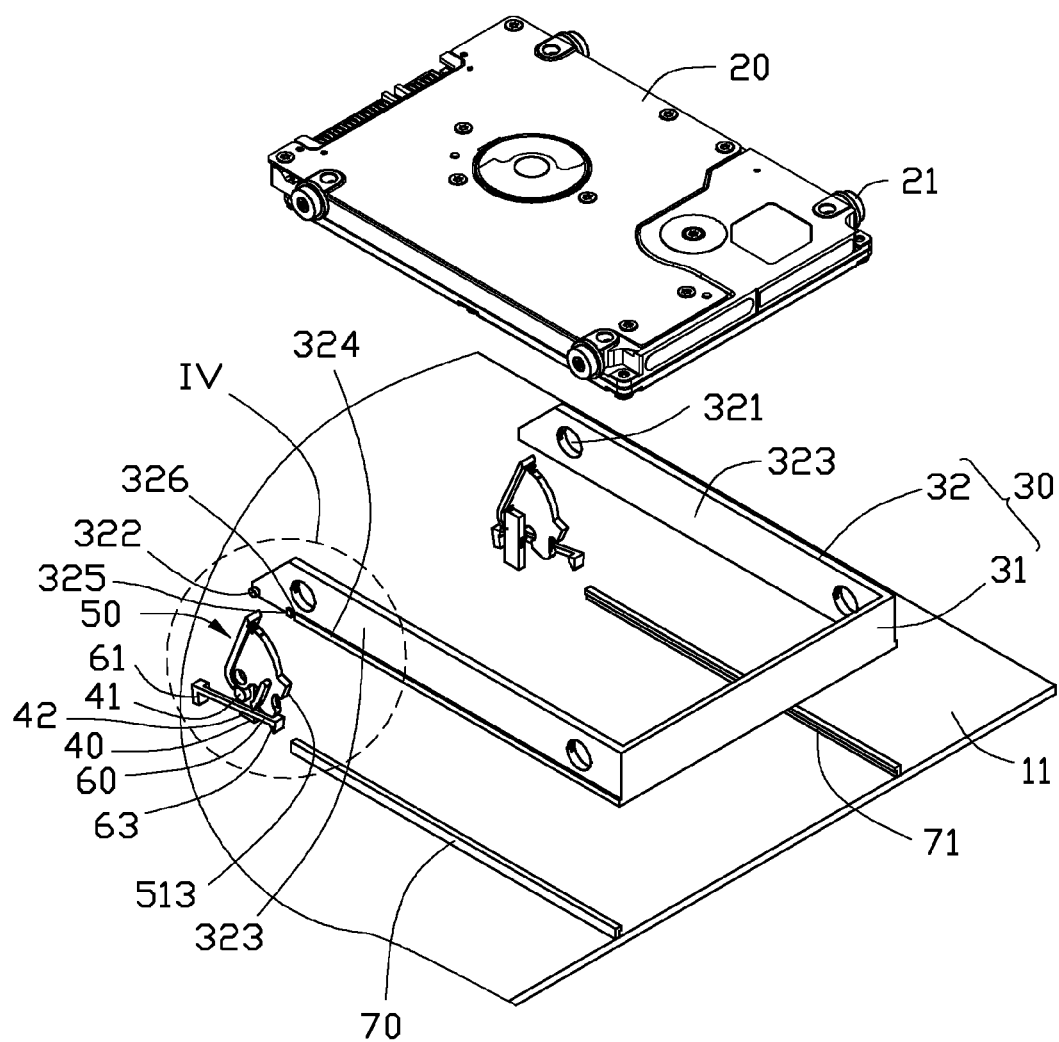
FIG. 3 is a further exploded, perspective view of the electronic device of FIG. 1, showing interior structure of the electronic device.
Figure 4:
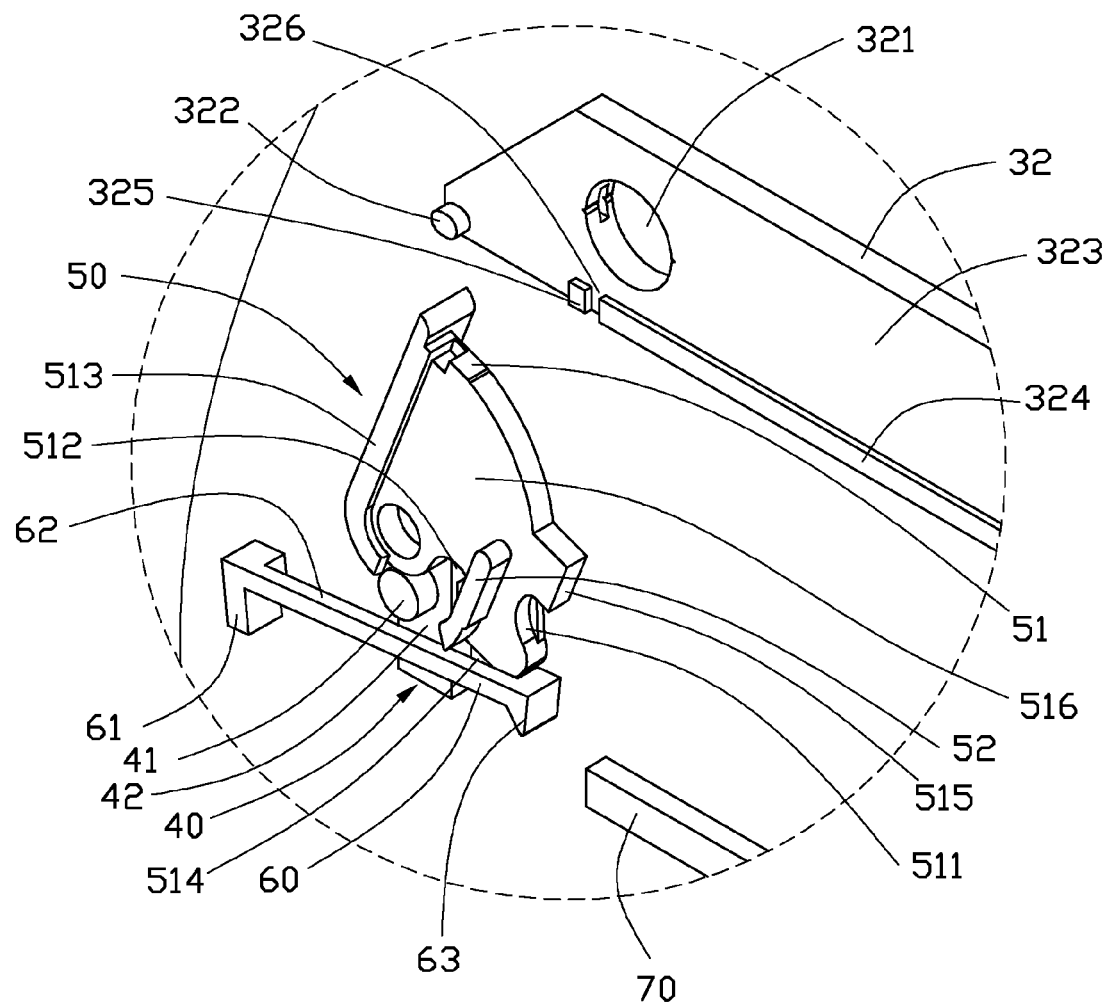
FIG. 4 is an enlarged view of the circled portion IV of FIG. 3.

Referring to FIGS. 3-4, the electronic device 100 further includes a frame 30, at least one support post 40, at least one latch member 50, and at least one resisting member 60. The frame 30 includes an operation portion 31 and two positioning portions 32. The length of the operation portion 31 is the same as that of the opening 13, and the width of the operation portion 31 is slightly greater than that of the opening 13. Thus, the frame 30 can be pushed into the main body 10 through the opening 13, and the operation portion 31 is exposed outside the main body 10 for operation.

Each positioning portion 32 is substantially perpendicular to and secured to the operation portion 31. In the embodiment, the positioning portions 32 are secured to opposite ends of the operation portion 31 and arranged at the same side of the operation portion 31. Each positioning portion 32 defines two through holes 321, each accommodating one projection 21 of the HDD 20 to fix the HDD 20 to the frame 30. A first positioning post 322 protrudes from the bottom of each of opposite sidewalls 323 of the positioning portions 32. In the embodiment, each first positioning post 322 is substantially cylindrical. A first limiting portion 324 and a second limiting portion 325 protrude from the bottom of the sidewall 323 of each positioning portion 32. The first limiting portion 324 and the second limiting portion 325 are spaced from each other and define a gap 326.

Each support post 40 protrudes from a lower surface of the first casing portion 11. In the embodiment, two support posts 40 are deployed. Each support post 40 includes a second positioning post 41 protruding from a sidewall 42 of the support post 40. The second positioning posts 41 are opposite to each other. In the embodiment, each second positioning post 41 is substantially cylindrical.

Each latch member 50 is rotatably connected to one support post 40. In the embodiment, two latch members 50 are deployed. Each latch member 50 can be rotated in and out of the main body 10 through one slot 121. Each latch member 50 includes a plate 51 and a pressable member 52.

Each plate 51 includes a first recessed portion 511 and a second recessed portion 512. The first recessed portion 511 is defined in a bottom 513 of each plate 51. The second recessed portion 512 is defined in a sidewall 514 of each plate 51. In the embodiment, the first recessed portion 511 and the second recessed portion 512 are arc-shaped, and the size of which are larger than a half circle. The first recessed portion 511 and the second recessed portion 512 respectively receive a portion of the first positioning post 322 and the second positioning post 41. When the latch member 50 is rotated to be received in the main body 10, a top 515 of the plate 51 is exposed outside the second casing portion 12 through one slot 121 for operation.

Each pressable member 52 protrudes from a surface 516 of the plate 51 and is parallel to the top 515. When the latch member 50 is rotated, the pressable member 52 depresses the resisting member 60, causing a part of the resisting member 60 to be received in the gap 326 to limit the movement of the frame 30. In the embodiment, the pressable member 52 is arranged between the first recessed portion 511 and the second recessed portion 512.

Each resisting member 60 includes a fixed end 61, a connection portion 62, and a free end 63 connected to the fixed end 61 through the connection portion 62. The fixed end 61 is attached to the lower surface of the first casing portion 11. The connection portion 62 is made of elastic material. The free end 63 can be depressed by the pressable member to be received in the gap 326. The free end 63 and the lower surface of the first casing portion 11 are spaced from each other, and the free end 63 returns to its original state to disengage from the gap 326 when the depression on the connection portion 62 is released.

The electronic device 100 further includes at least one guide member 70 attached to the lower surface of the first casing portion 11. In the embodiment, two guide members 70 are deployed, the guide members 70 are substantially parallel to each other. The distance between two guide members 70 is the same as the length of the operation portion 31. Each guide member 70 defines a guide slot 71 to receive the first limiting portion 324 and the second limiting portion 325 to guide the movement of the frame 30.

Figure 5:
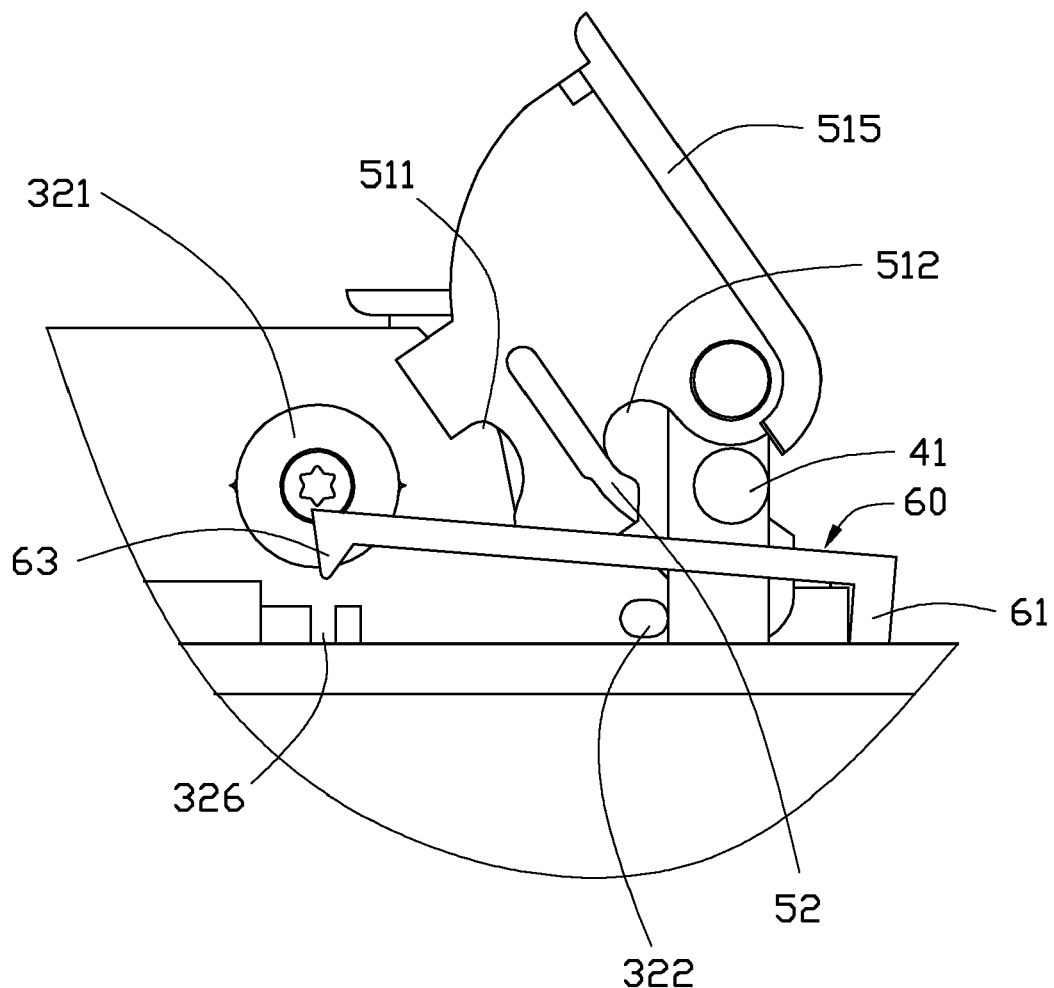
FIG. 5 is a schematic view of the electronic device of FIG. 1, showing a first state of a latch member of the electronic device.
Figure 6:
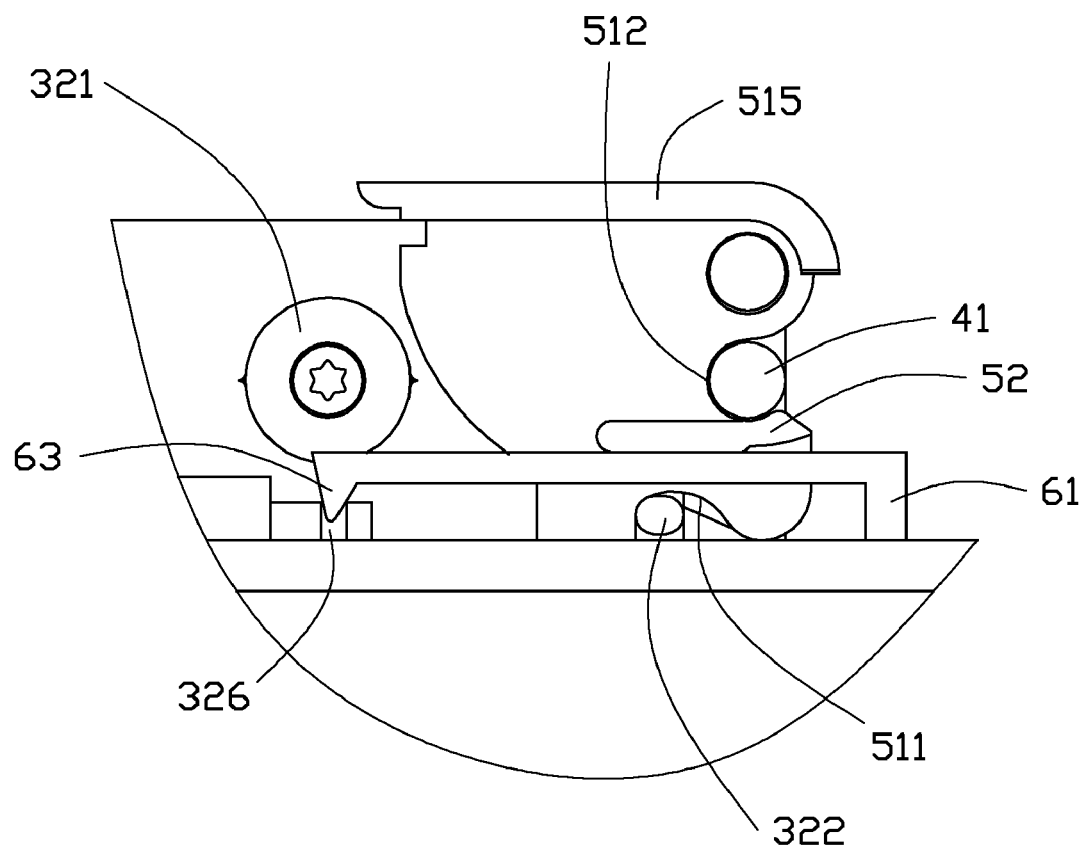
FIG. 6 is similar to FIG. 5, but showing a second state of the latch member of the electronic device.

Referring to FIGS. 5-6, to assemble the HDD 20, the HDD 20 is placed in the frame 30 and each projection 21 is received in one receiving hole 321. The frame 30 is pushed into the main body 10 through the opening 13 along the guide members 70 until the frame 30 resists the latch members 50. At this point, the top 515 is depressed to be received in the slot 121, driving the pressable member 52 to depress the resisting member 60 until the free end 63 is received in the gap 326. And then drives the first recessed portion 511 and the second recessed portion 512 to respectively hook the first positioning post 322 and the second positioning post 41. At this point, the frame 30 is latched to the main body 10.

To remove the HDD 20, the top 515 of the plate 51 is rotated out of the slot 121, driving the first recessed portion 511 and the second recessed portion 512 respectively disengaging from the first positioning post 322 and the second positioning post 41, and driving the pressable member 52 to disengage from the resisting member 60. At this point, the free end 63 returns to its original state to disengage from the gap 326, thus the frame 30 can be pulled out of the main body 10 by pulling the operation portion 31.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
a main body defining an opening and comprising a first casing portion and a second casing portion, the second casing portion defining at least one slot;
a hard disc drive (HDD);
a frame capable of securing the HDD and being moved into and out of the main body through the opening, at least one first positioning post protruding from the frame; and
at least one latch member rotatably connected to first casing portion and capable of being rotated into and out of the main body through the at least one slot, each of the at least one latch member defining a first recessed portion, each of the at least one first recessed portion accommodating a portion of one of the at least one first positioning post to latch the frame to the electronic device.

2. The electronic device as described in claim 1, further comprising at least one support post protruding from the first casing portion, wherein a second positioning post protrudes from each of the at least one support post, each of the at least one latch member further defines a second recessed portion, each of the at least one second recessed portion is configured to accommodate a portion of one of the at least one second positioning post.

3. The electronic device as described in claim 2, wherein each of the at least one first recessed portion and second recessed portion are arc-shaped, the size of each of the at least one first recessed portion and second recessed portion are larger than a half circle, and each of the at least one first positioning post and the at least one second positioning post are cylindrical.

4. The electronic device as described in claim 2, wherein the frame comprises an operation portion and two positioning portions, each of the positioning portions is substantially perpendicularly to and secured to the opposite end of operation portion, the positioning portions defines two receiving holes, at least two projections protrude from the HDD, each of the projections is received in one of the receiving holes.

5. The electronic device as described in claim 4, wherein each of the projections is made of rubber material.

6. The electronic device as described in claim 4 further comprising at least one resisting member, wherein each of the at least one resisting member comprises a fixed end, a connecting portion, and a free end connected to the fixed end through the connecting portion, the connecting portion are made of elastic material, a first limiting portion and a second limiting portion protrude from each of the at least one positioning portion, the first limiting portion and the second limiting portion are spaced from each other, and define a gap to receive the free end.

7. The electronic device as described in claim 6, further comprising at least one guide member, wherein each of the at least one guide member defines a guide slot to receive the first limiting portion and the second limiting portion to guide the movement of the frame.

8. The electronic device as described in claim 6, wherein each of the at least one latch member comprises a pressable member, each of the pressable members is driven to depress one of the connecting portion, causing the free end to be received in the gap to limit the movement of the frame.

9. The electronic device as described in claim 6, wherein the free end and the first casing portion are spaced from each other.

10. The electronic device as described in claim 3, wherein the length of the operation portion is the same as that of the opening, and the width of the operation portion is slightly greater than that of the opening for operation.

11. The electronic device as described in claim 2, wherein each of the at least one latch member further comprises a plate, a top of the plate is exposed outside of the main body through one of the slots for operated to rotate the latch member.

12. An electronic device comprising:
a main body defining an opening and comprising a first casing portion and a second casing portion, the second casing portion defining two slots;
a hard disc drive (HDD);
a frame capable of securing the HDD and being moved into and out of the main body through the opening, two first positioning posts protruding from the frame; and
two latch members rotatably connected to first casing portion and capable of being rotated into and out of the main body through one of the slots, each of the latch members defining a first recessed portion, each of the first recessed portions accommodating a portion of one of the first positioning posts to latch the frame to the electronic device.

13. The electronic device as described in claim 12, further comprising two support posts protruding from the first casing portion, wherein a second positioning post protrudes from each of the support posts, each of the latch members further defines a second recessed portion, each of the second recessed portions is configured to accommodate a portion of one of the second positioning posts.

14. The electronic device as described in claim 13, wherein each of the first recessed portions and second recessed portions are arc-shaped, the size of each of the first recessed portions and second recessed portions are larger than a half circle, and each of the first positioning posts and the second positioning posts are cylindrical.

15. The electronic device as described in claim 13, wherein the frame comprises an operation portion and two positioning portions, each of the positioning portions is substantially perpendicularly to and secured to the opposite end of operation portion, each of the positioning portions defines two receiving holes, at least two projections protrude from the HDD, each of the projections is received in one of the receiving holes.

16. The electronic device as described in claim 15, wherein each of the projections is made of rubber material.

17. The electronic device as described in claim 15 further comprising two resisting members, wherein each of the resisting members comprises a fixed end, a connecting portion, and a free end connected to the fixed end through the connecting portion, the connecting portion are made of elastic material, a first limiting portion and a second limiting portion protrude from each of the positioning portions, the first limiting portion and the second limiting portion are spaced from each other, and define a gap to receive the free end.

18. The electronic device as described in claim 17, wherein each of latch members comprises a pressable member, each of the pressable members is driven to depress one of the connecting portion, causing the free end to be received in the gap to limit the movement of the frame.

19. The electronic device as described in claim 17, further comprising two guide members, wherein each of the guide members defines a guide slot to receive the first limiting portion and the second limiting portion to guide the movement of the frame.

20. The electronic device as described in claim 17, wherein the free end and the first casing portion are spaced from each other.

\* \* \* \* \*